(12) United States Patent
Hsu

(10) Patent No.: US 9,152,348 B2
(45) Date of Patent: Oct. 6, 2015

(54) DATA TRANSMITTING METHOD, MEMORY CONTROLLER AND DATA TRANSMITTING SYSTEM

(71) Applicant: PHISON ELECTRONICS CORP., Miaoli (TW)

(72) Inventor: Shih-Hsien Hsu, Changhua County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 13/783,419

(22) Filed: Mar. 4, 2013

(65) Prior Publication Data

US 2014/0181324 A1    Jun. 26, 2014

(30) Foreign Application Priority Data

Dec. 22, 2012  (TW) .............. 101149284 A

(51) Int. Cl.
  *G06F 3/00* (2006.01)
  *G06F 3/06* (2006.01)

(52) U.S. Cl.
  CPC ............ *G06F 3/0659* (2013.01); *G06F 3/0623* (2013.01); *G06F 3/0679* (2013.01); *G06F 3/0688* (2013.01)

(58) Field of Classification Search
  None
  See application file for complete search history.

(56) References Cited

U.S. PATENT DOCUMENTS

| | | | | |
|---|---|---|---|---|
| 5,850,556 A | * | 12/1998 | Grivna ........................ | 710/260 |
| 6,081,866 A | * | 6/2000 | Grivna ........................ | 710/260 |
| 6,157,975 A | * | 12/2000 | Brief et al. .................. | 710/104 |
| 6,457,081 B1 | * | 9/2002 | Gulick ........................ | 710/305 |
| 7,007,120 B2 | * | 2/2006 | Spencer et al. .............. | 710/110 |
| 7,133,730 B1 | * | 11/2006 | Katayama et al. ........... | 700/94 |
| 7,430,618 B2 | * | 9/2008 | Ishida et al. ................. | 710/5 |
| 2004/0184414 A1 | * | 9/2004 | Ohki et al. .................. | 370/260 |
| 2004/0199702 A1 | * | 10/2004 | Baba ........................... | 710/305 |
| 2004/0267993 A1 | * | 12/2004 | Spencer et al. .............. | 710/110 |
| 2013/0042025 A1 | * | 2/2013 | Ennesser ..................... | 710/5 |

FOREIGN PATENT DOCUMENTS

CN    102770850    11/2012

OTHER PUBLICATIONS

"Office Action of Taiwan Counterpart Application", issued on Apr. 24, 2015, p. 1-p. 9.

* cited by examiner

*Primary Examiner* — Ilwoo Park
*Assistant Examiner* — Aurangzeb Hassan
(74) *Attorney, Agent, or Firm* — Jianq Chyun IP Office

(57) ABSTRACT

A data transmitting method for a memory controller is provided. A host system executes threads to transmit commands through a human interface device (HID) interface. The method includes: receiving a command packet from the host system; executing an operation corresponding to a command according to the command packet to generate responding data, which is divided into at least one responding data packet by the memory controller; transmitting a responding packet and the responding data packet to the host system by the memory controller; determining if one of the at least one responding data packet is lost according to the responding packet by the host system; if a responding data packet is lost, transmitting a retransmitting packet to the memory controller by the host system to request the memory controller to retransmit the lost responding data packet. Accordingly, the data transmission amount is improved, and the integrity of data is ensured.

23 Claims, 7 Drawing Sheets

DATA TRANSMITTING METHOD, MEMORY CONTROLLER AND DATA TRANSMITTING SYSTEM

CROSS-REFERENCE TO RELATED APPLICATION

This application claims the priority benefit of Taiwan application serial no. 101149284, filed on Dec. 22, 2012. The entirety of the above-mentioned patent application is hereby incorporated by reference herein and made a part of this specification.

BACKGROUND

1. Technical Field

The present invention generally relates to a data transmitting method, in particular, to a data transmitting method, a memory controller, and a data transmitting system related to a human interface device class.

2. Description of Related Art

While digital cameras, mobile phones, and MP3 players have been growing rapidly in the recent years, the consumers have higher demands on storage media. Rewritable non-volatile memory modules such as flash memories are well-suited to be built in each of the portable multimedia devices as illustrated above due to the characteristics of non-volatility, low power consumption, small volume as well as non-mechanical structure.

Generally speaking, a flash memory is controlled by a memory controller, and such memory controller is used along with a host system. A user may transmit vendor commands via applications on the host system to the memory controller. However, under some circumstances, the type of the vendor commands may be a small computer system interface (SCSI) command. If an administrator right of an operating system is not given to the user or the applications, the applications are not able to transmit the SCSI command to the memory controller. One of the solutions is to transmit data or commands through a human interface device (HID) interface. However, the transmitting bandwidth of the HID interface is limited and does not satisfy the requirements of the applications under some circumstances. Moreover, if there exist a plurality of threads to be sent to the memory controller on the host system, a piece of data may be transmitted to a wrong thread. Accordingly, the integrity of data between the host system and the memory controller is not ensured.

Hence, to improve the data transmission amount on the HID interface and to ensure the integrity of data are the concerned issues to those skilled in art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the exemplary embodiments of the present invention is directed to a data transmitting method, a memory controller, and a data transmitting system which are able to improve the data transmission amount and ensure the integrity of data.

According to an exemplary embodiment of the present invention, a data transmitting method for a memory controller is provided. The memory controller is used for coupling to a host system, and the host system is used for executing a plurality of threads so as to transmit a plurality of commands to the memory controller via at least one human interface device (HID) interfaces. Each of the commands corresponds to one of the threads. A plurality of packets are transmitted between the memory controller and the host system, wherein each of the packets corresponds with a HID class and at least includes a command series column and a data column. The data transmitting method includes the following steps. The memory controller receives a command packet among the packets from the host system, wherein the command series column of the command packet records a first command among the commands, and the data column of the command packet records a content of the first command. The memory controller executes an operation corresponding to the first command according to the content of the first command so as to generate responding data, wherein the responding data is divided into at least one responding data packet. The memory controller transmits a responding packet to the host system, wherein the command series column of the responding packet records the first command. The memory controller transmits the at least one responding data packet to the host system, wherein the command series column of the at least one responding data packet records the first command. The host system determines if one of the at least one responding data packet is lost according to the responding packet. If the host system determines that a first responding data packet among the at least one responding data packet is lost, the host system transmits a retransmitting packet to the memory controller so as to request the memory controller to retransmit the first responding data packet, wherein the command series column of the retransmitting packet records the first command. The memory controller retransmits the first responding data packet to the host system so as to response to the retransmitting packet.

In another aspect, according to an exemplary embodiment of the present invention, a memory controller used for controlling a rewriteable non-volatile memory module is provided. The memory controller includes a host interface, a memory interface, and a memory management circuit. The memory controller is used for coupling to a host system. The memory interface is used for coupling to the rewriteable non-volatile memory module. The memory management circuit is coupled to the host interface and the memory interface and used for receiving at least one command packet from the host system, wherein the command series column of the at least one command packet records a first command, and the data column of the at least one command packet records a content of the first command. The memory management circuit is used for executing an operation corresponding to the first command at least according to the content of the first command so as to generate responding data, wherein the responding data is divided into at least one responding data packet. The memory management circuit is used for transmitting a responding packet to the host system, wherein the command series column of the responding packet records the first command. The memory management circuit is used for transmitting the at least one responding data packet to the host system, wherein the command series column of the at least one responding data packet records the first command. The memory management circuit is used for receiving a retransmitting packet from the host system if a first responding data packet among the at least one responding data packet is lost, wherein the command series column of the retransmitting packet records the first command. The memory management circuit is used for retransmitting the first responding data packet to the host system so as to response to the retransmitting packet.

In another aspect, according to an exemplary embodiment of the present invention, a data transmitting system including the aforementioned host system and a memory storage device is provided. The host system is used for executing a plurality of threads so as to transmit a plurality of commands to the memory storage device via at least one HID interfaces. The aforementioned packets are transmitted between the memory storage device and the host system. The memory storage device is used for receiving at least one command packet from the host system. The command series column of the command packet records a first command, and the data column of the command packet records a content of the first command. The memory storage device is used for executing an operation corresponding to the first command according to the content of the first command so as to generate responding data, wherein the responding data is divided into at least one responding data packet. The memory storage device is used for transmitting a responding packet to the host system, wherein the command series column of the at least one responding packet records the first command. The memory storage device is also used for transmitting the aforementioned responding data packet to the host system, wherein the command series column of the at least one responding data packet records the first command. The host system is used for determining if one of the at least one responding data packet is lost according to the responding packet. If the host system determines that a first responding data packet among the responding data packet is lost, the host system is used for transmitting a retransmitting packet to the memory storage device so as to request the memory storage device to retransmit the first responding data packet, wherein the command series column of the retransmitting packet records the first command. The memory storage device is further used for retransmitting the first responding data packet to the host system so as to response to the retransmitting packet.

To sum up, in the data transmitting method, the memory controller, the memory storage device, and the data transmitting system provided in the exemplary embodiments of the present invention, since a lost responding data packet is able to be retransmitted, the integrity of data is ensured. On the other hand, since each of the commands may be executed independently, the data transmission rate and amount may be improved.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
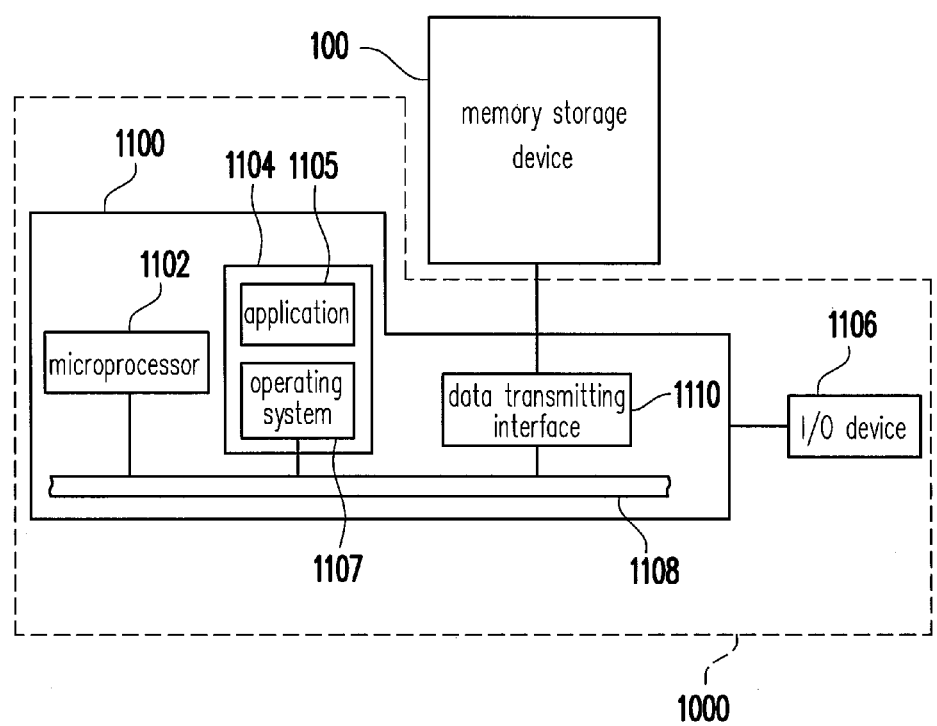
FIG. 1A is a host system and a memory storage device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage device (also referred to as a memory storage system) includes a rewriteable non-volatile memory module and a controller (also referred to as a control circuit). The memory storage device is normally used along with a hosts system so that the host system may be able to write data into the memory storage device or read data from the memory storage device.

FIG. 1A is a host system and a memory storage device according to an exemplary embodiment.

Figure 1B:
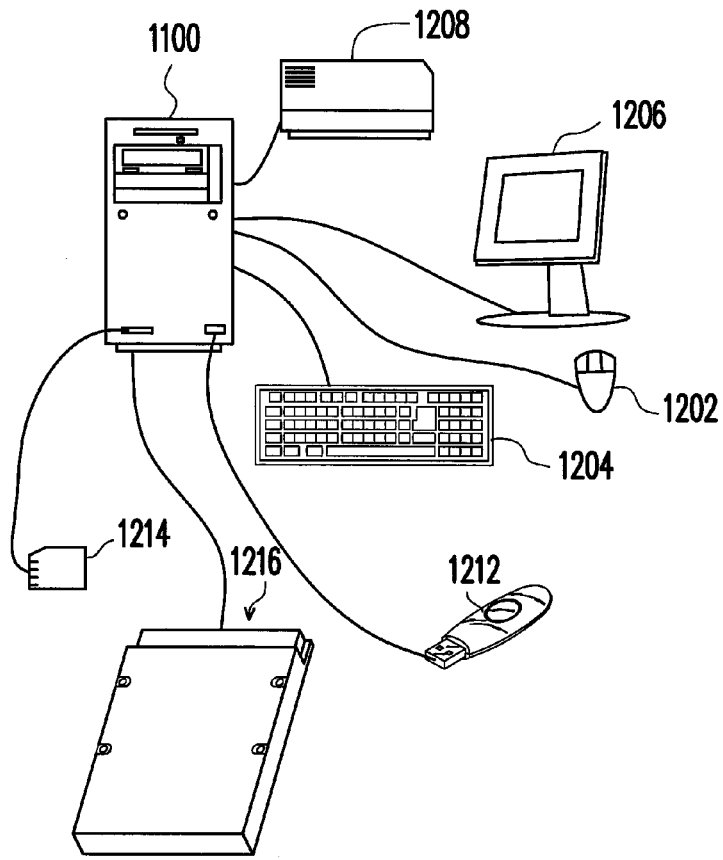
FIG. 1B is a schematic diagram of a computer, I/O devices, and a memory storage device according to an exemplary embodiment.

Referring to FIG. 1A, a host system 1000 generally includes a computer 1100 and input/output (I/O) devices 1106. The computer 1100 includes a microprocessor 1102, a random access memory (RAM) 1104, a system bus 1108, and a data transmitting interface 1110. The RAM 1104 stores an application 1105 and an operating system 1107. The I/O devices 1106 includes a mouse 1202, a keyboard 1204, a display 1206, and a printer 1208 as illustrated in FIG. 1B. It is noted that the I/O devices 1106 are not limited to the devices illustrated in FIG. 1B, and the I/O devices may further include other devices.

According to an embodiment of the present invention, the memory storage device 100 is coupled to other components via the data transmitting interface 1110 and the host system 1000. Data may be written into the memory storage device 100 or read from the memory storage device 100 through the operations of the microprocessor 1102, the RAM 1104, and the I/O devices 1106. For example, the memory storage device 100 may be a rewriteable non-volatile device such as a disk 1212, a memory card 1214, or a solid state drive (SSD) 1216 as illustrated in FIG. 1B.

Figure 1C:
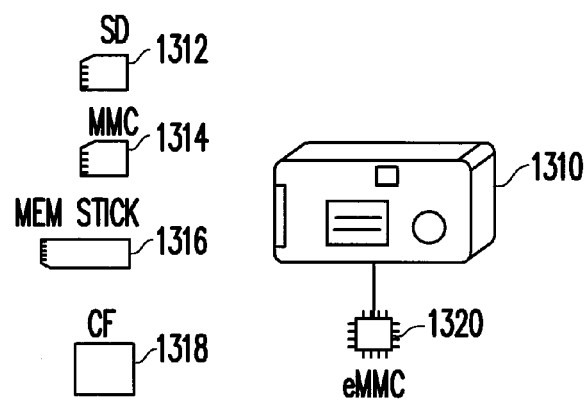
FIG. 1C is a schematic diagram of a host system and a memory storage device according to an exemplary embodiment.

Generally speaking, the host system 1000 may be any system substantially incorporating with the storage memory device 100 for data storage. The host system 1000 is illustrated as a computer system in an embodiment of the present invention, and yet the host system 1000 may be a system such as a digital camera, a camcorder, a communication device, an audio player, or a video player in another embodiment of the present invention. For example, if the host system is a digital camera (a camcorder) 1310, the rewriteable non-volatile memory storage device may be a SD card 1312, a MMC card 1314, a memory stick 1316, a CF card 1318, or an embedded storage device 1320 used thereby (as illustrated in FIG. 1C). The embedded storage device 1320 includes an embedded MMC (eMMC). It is noted that the eMMC is directly coupled to a baseboard of the host system.

Figure 2:
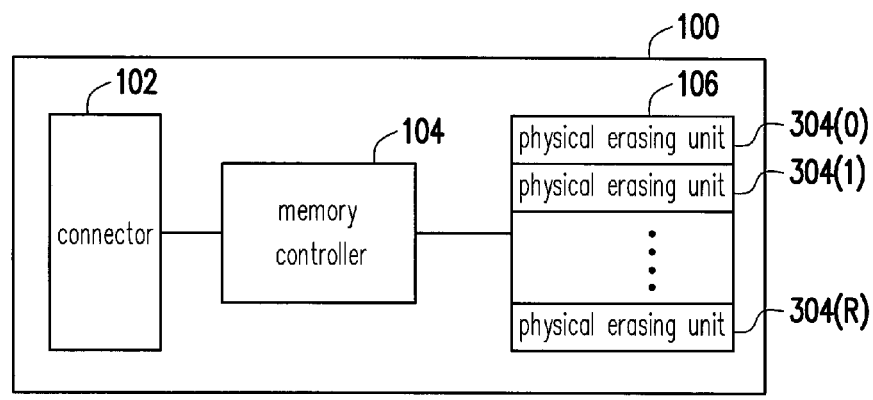
FIG. 2 is a concept block diagram of the memory storage device in FIG. 1A.

FIG. 2 is a concept block diagram of the memory storage device in FIG. 1A.

Referring to FIG. 2, the memory storage device 100 includes a connector 102, a memory controller 104, and a rewriteable non-volatile memory module 106.

In the present exemplary embodiment, the connector 102 is compatible with the Universal Serial Bus (USB) standard. The USB standard defines a human interface device class (HID class) and a mass storage device class so that the host system 1000 may be able to transmit a command or data to the connector 102 through one of the classes. If the host system 1000 transmits a command through the HID class, the application 1105 on the host system 1000 may call an application interface (API) provided by the operating system 1107, and the API may transmit the command or the data via a driver of the memory storage device 100. The connector 102 supports one or a plurality of HID interfaces, and the application 1105 may transmit the command or the data to the connector 102 via the HID interfaces. However, the present invention is not limited thereto. The application 1105 may also transmit the command or the data to the connector 102 via the mass storage device class.

It is noted that the connector 102 may also be compatible with other suitable standards in other exemplary embodiments.

The memory controller 104 is used for executing a plurality of logic gates or control commands implemented in a hardware or a firmware form and performing operations such as writing data, reading data, or erasing data in the rewriteable non-volatile memory module 106 according to the command of the host system 1000.

The rewriteable non-volatile memory module 106 is coupled to the memory controller 104 and used for storing the write-in data from the host system 1000. The rewriteable non-volatile memory module 106 includes physical erasing units 304(0)-304(R). For example, the physical erasing units 304(0)-304(R) may belong to a same memory die or different memory dies. Each of the physical erasing units includes a plurality of physical programming units respectively, wherein the physical programming units belonging to the same physical erasing unit are written in independently and erased simultaneously. For example, each of the physical erasing units is composed by 128 physical programming units. It is noted that the present invention is not limited thereto. Each of the physical erasing units may be composed by 64 physical programming units, 256 physical programming units or other numbers of physical programming units.

More specifically, the physical erasing unit is the smallest unit for erasing data. That is, each of the physical erasing unit contains the least number of memory cells that are erased simultaneously. The physical programming unit is the smallest unit for programming data. That is, the physical programming unit is the smallest unit for writing data. Each of the physical programming units normally includes a data bit region and a redundant bit region. The data bit region includes a plurality of physical accessing addresses for storing user data, and the redundant bit region is used for storing system data (e.g. data controlling and error correcting codes). In the present exemplary embodiment, the data bit region of each of the physical programming units includes 4 physical accessing addresses, wherein each of the physical accessing addresses contains 512 bytes (B). However, in other exemplary embodiments, the data bit region may also include 8, 16, more number or less number of the physical accessing addresses. The present invention is not limited to the size and the number of the physical accessing addresses. For example, the physical erasing unit may be a physical block, and the physical programming unit may be a physical page or a physical sector.

In the present exemplary embodiment, the rewriteable non-volatile memory module 106 is a multi-level cell (MLC) NAND-type flash memory module. That is, at least 2 bits of data is able to be stored in a single memory cell. However, the present invention is not limited thereto. The rewritable non-volatile memory module 106 may also be a single-level cell (SLC) NAND-type flash memory module, a trinary-level cell (TLC) NAND-type flash memory module, other flash memory modules, or other memory module with the same characteristics.

Figure 3:
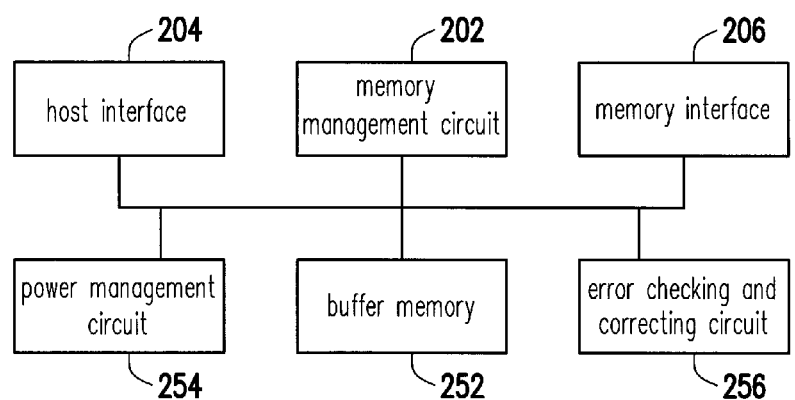
FIG. 3 is a concept block diagram of the memory controller according to an exemplary embodiment.

FIG. 3 is a concept block diagram of the memory controller.

Referring to FIG. 3, the memory controller 104 includes a memory management circuit 202, a host interface 204, and a memory interface 206.

The memory management circuit 202 is used for controlling the overall operation of the memory controller 104. To be more specific, the memory management circuit 202 includes a plurality of control commands. When the memory storing device 100 is operated, the control commands are executed so as to perform operations such as writing data, reading data, and erasing data.

In the present exemplary embodiment, the control commands of the memory management circuit 202 are implemented in a firmware form. For example, the memory management circuit 202 includes a micro-processor unit (unillustrated) and a read-only memory (unillustrated), and the control commands are burned in the read-only memory. When the memory storing device 100 is operated, the control commands are executed by the micro-processor unit to perform data writing, data reading, and data erasing.

In another exemplary embodiment of the present invention, the control commands of the memory management circuit 202 may also be stored as programming codes in a specific region (such as a system region in a memory module exclusively used for storing system data) of the rewritable non-volatile memory module 106. Moreover, the memory management circuit 202 includes a micro-processor unit (unillustrated), a read-only memory (unillustrated), and a random access memory (unillustrated). The read-only memory specially includes driver codes. When the rewritable non-volatile memory module 106 is enabled, the micro-processor unit firstly executes the driver codes to load the control commands stored in the rewritable non-volatile memory module 106 to the random access memory of the memory management circuit 202. Then, the micro-processor unit may execute the control commands to perform operations such as data writing, data reading, and data erasing.

Moreover, in another exemplary embodiment of the present invention, the control commands of the memory management circuit 202 may be implemented in a hardware form. For example, the memory management circuit 202 includes a micro-controller, a memory management unit, a memory writing unit, a memory reading unit, a memory erasing unit, and a data processing unit. The memory management unit, the memory writing unit, the memory reading unit, the memory erasing unit, and the data processing unit are coupled to the micro-controller. The memory management unit is used for managing the physical erasing units of the rewritable non-volatile memory module 106. The memory writing unit is used for transmitting a write command to the rewritable non-volatile memory module 106 so as to write data into the rewritable non-volatile memory module 106. The memory reading unit is used for transmitting a read command to the rewritable non-volatile memory module 106 so as to read data from the rewritable non-volatile memory module 106. The memory erasing unit is used for transmitting an erase command to the rewritable non-volatile memory module 106 so as to erase data from the rewritable non-volatile memory module 106.

The host interface 204 is coupled to the memory management circuit 202 and used for receiving and identifying commands and data from the host system 1000. That is, the commands and data from the host system 1000 are transmitted to the memory management circuit 202 via the host interface 204. In the present exemplary embodiment, the host interface 204 is compatible with the USB standard. However, it should be understood that the present invention is not limited thereto. The host interface 204 may also be compatible with other suitable data transmitting standards.

The memory interface 206 is coupled to the memory management circuit 202 and used for accessing the rewritable non-volatile memory module 106. That is, data to be written into the rewritable non-volatile memory module 106 is converted by the memory interface 206 to a format acceptable by the rewritable non-volatile memory module 106.

In another exemplary embodiment of the present invention, the memory controller 104 further includes a buffer memory 252, a power management circuit 254, and an error checking and correcting circuit 256.

The buffer memory 252 is coupled to the memory management circuit 202 and used for temporarily storing data and commands from the host system 1000 or data from the rewritable non-volatile memory module 106.

The power management circuit 254 is coupled to the memory management circuit 202 and used for controlling the power of the rewritable non-volatile memory module 106.

The error checking and correcting circuit 256 is coupled to the memory management circuit 202 and used for executing an error checking and correcting procedure to ensure data accuracy. To be specific, when the memory management circuit 202 receives a write command from the host system 1000, the error checking and correcting circuit 256 generates error checking and correcting (ECC) codes for the data corresponding to the write command, and the memory management circuit 202 may write the data corresponding to the write command and the corresponding ECC codes into the rewritable non-volatile memory module 106. Subsequently, when the memory management circuit 202 reads data from the rewritable non-volatile memory module 106, it simultaneously reads the ECC codes corresponding to the data, and the error checking and correcting unit 256 may execute the error checking and correcting procedure on the read data according to the ECC codes.

In the present exemplary embodiment, the application 1105 on the host system 1000 may transmit one or a plurality of commands and data to the memory management circuit 202 (or the memory controller 104) via the HID interface. Under the regulation of the HID class, the application 1105 may transmit or receive a packet by using a control pipe or an interrupt pipe. Such packet may include the complete commands or the data or a portion of the commands or the data. If the control pipe is used, the size of a packet is at most 64 bytes. If the interrupt pipe is used, the size of a packet is at most 64 bytes (in the USB 1.1 standard) or 1024 bytes (in the USB 2.0 standard and the USB 3.0 standard). In the present exemplary embodiment, the application 1105 and the memory management circuit 202 (or the memory controller 104) use the interrupt pipe for transmitting or receiving the packet. However, in other exemplary embodiments, the application 1105 and the memory management circuit 202 (or the memory controller 104) may also use the control pipe, and the present invention is not limited thereto.

On the other hand, the memory management circuit 202 (or the memory controller 104) determines a polling interval with a micro-frame as a unit. The polling interval is used for representing a time interval for receiving a packet by the driver of the memory storage device 100. For example, if 8 micro-frames are transmitted to the host system 1000 from the memory storage device 100 per 1 ms, the driver of the memory storage device 100 may receive up to 8000 packets in a second. However, the present invention is not limited to the value of the polling interval.

The memory management circuit 202 (or the memory controller 104) may adjust the sizes of the polling interval and the packet so as to increase the data transmission rate. However, the application 1105 communicates with the driver through an application interface. If the hardware of the host system 1000 is inefficient, the application 1105 is not able to receive each packet through the application interface in time and cause packet loss. On the other hand, the application 1105 may execute a plurality of threads, wherein each of the threads may transmit a different command to the memory storage device 100. In an exemplary embodiment, the application 1105 and the memory management circuit 202 (or the memory controller 104) may handle lost packets and ensure each packet is sent to the corresponding thread.

Figure 4:
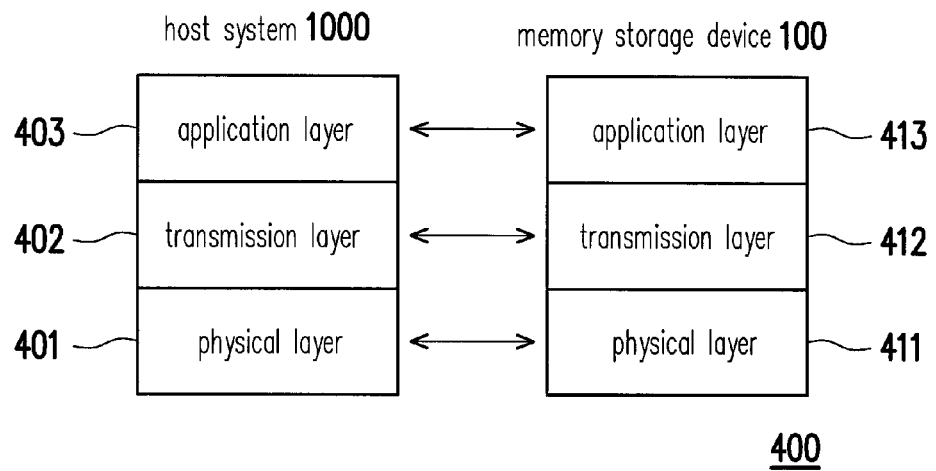
FIG. 4 is a schematic diagram of transport layers of a host system and a memory storage device according to an exemplary embodiment.

FIG. 4 is a schematic diagram of transport layers of a host system and a memory storage device according to an exemplary embodiment.

Referring to FIG. 4, the data transmitting system 400 includes a host system 1000 and a memory storage device 100. The host system 1000 and the memory storage device 100 are individually and logically divided into a physical layer, a transmission layer, and an application layer. A physical layer 401, a transmission layer 402, and an application layer 403 of the host system 1000 correspond to a physical layer 411, a transmission layer 412, and an application layer 413 of the memory storage device 100 respectively. The physical layer is in charge of transmitting and receiving a packet. The transmission layer is in charge of dividing a piece of data (e.g. a file) into one or a plurality of packets or grouping a plurality of packets into a piece of data. If a packet is lost and needs to be retransmitted, the transmission layer may request for data retransmission. On the other hand, an application belongs to the application layer. When the application 1105 on the host system 1000 transmits commands or data to the memory storage device 100, the application 1105 passes the commands or the data to the transmission layer 402. The transmission layer 402 divides the commands or the data into one or a plurality of packets and transmits the packets to the physical layer 401. The physical layer 401 transmits the packets to the physical layer 411 of the memory storage device 100. The physical layer 411 passes the packets to the transmission layer 412, and the transmission layer 412 groups the received packets into commands or data and passes the commands and data to the application layer 413. The memory management circuit 202 (or the memory controller 104) executes the commands or process the data in the application layer 413. The memory management circuit 202 (or the memory controller 104) generates one or a plurality of results or responses after finishing executing such commands. Then, the results or responses are transmitted to the application 1105 via the transmission layer 412, the physical layer 411, the physical layer 401, the transmission layer 402, and the application layer 403.

In the present exemplary embodiment, a plurality of commands are to be transmitted by the host system 1000 to the memory storage device 100. The application 1105 includes a plurality of threads, and each of the commands is processed by one of the threads and transmitted to the memory storage device 100. However, each packet corresponding with the HID class and transmitted between the host system 1000 and the memory storage device 100 includes a command series column, wherein the command series column includes a command series. The command series is used for indicating which command that a packet corresponds to. By that means, each of the packets may be transmitted to the corresponding thread.

Moreover, each of the packets transmitted between the host system 1000 and the memory storage device 100 further includes a packet type column, a transmitting series column, and a data column. A packet structure will be illustrated in an exemplary embodiment hereinafter.

Figure 5:
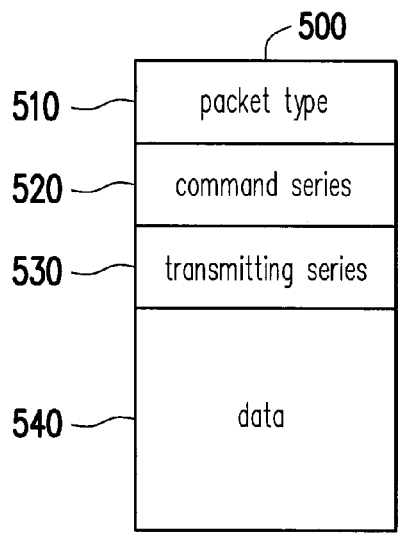
FIG. 5 is a schematic diagram of a packet according to an exemplary embodiment.

FIG. 5 is a schematic diagram of a packet according to an exemplary embodiment.

Referring to FIG. 5, a packet 500 includes a packet type column 510, a command series column 520, a transmitting series column 530, and a data column 540.

The command series column 520 records a command corresponding to the packet 500. Assume that the packet 500 corresponds to a first command herein.

The transmitting series column 530 records a transmitting series of the packet 500. For example, if the host system 1000 transmits command data to the memory management circuit 202 (or the memory controller 104) according to the first command, such command data is divided into a plurality of data packets. The packet 500 belongs to one of the data packets, and the transmitting series is used for indicating a serial number of the packet 500 among the data packets. Although the transmitting order of the data packet may not be fixed, the memory management circuit 202 (or the memory controller 104) may group the data packets into command data according to the transmitting series of the data packets after receiving the data packets.

The data column 540 may record data, and yet the content of the data is not limited in the present invention.

The packet type column 510 may record a packet type of the packet 500, wherein the packet type is used for indicating that the packet 500 belongs to one of a data packet, a command packet, a retransmitting packet, a responding packet, and a status packet. To be more specific, when a packet is transmitted from the host system 1000 to the memory storage device 100, the packet belongs to one of the data packet, the command packet, and the retransmitting packet. On the other hand, when a packet is transmitted from the memory storage device 100 to the host system 1000, the packet may belong to one of the data packet, the responding packet, and the status packet. The data packet transmitted from the host system 1000 to the memory storage device 100 is also referred to as a transmitting data packet, and the data packet transmitted back from the memory storage device 100 to the host system 1000 is also referred to as a responding data packet herein. The function of each of the packet types will be described along with figures hereinafter.

Figure 6:
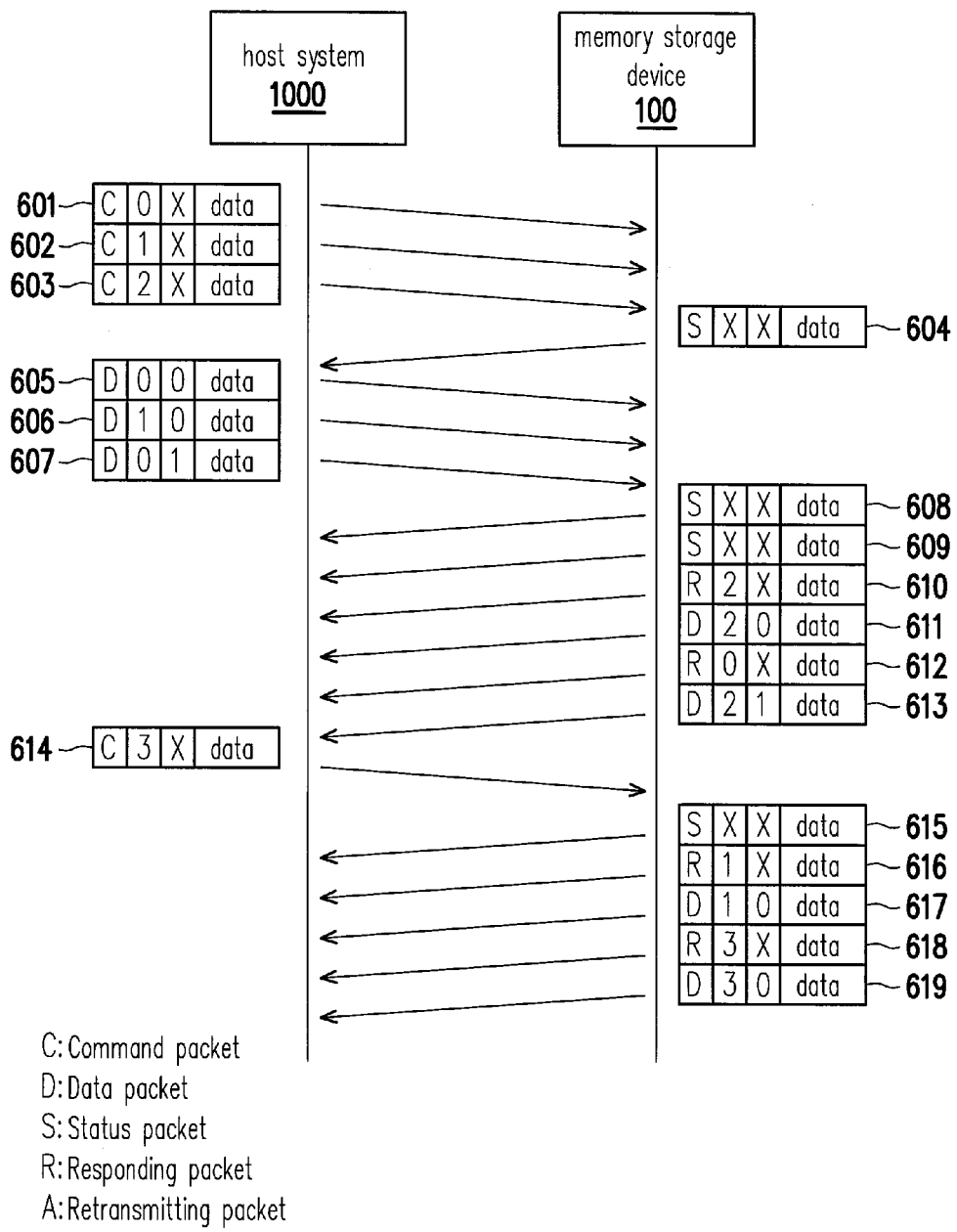
FIG. 6 is a flow chart of packet transmission according to an exemplary embodiment.

FIG. 6 is a flow chart of packet transmission according to an exemplary embodiment.

Referring to FIG. 6, assume that three threads are executed on the host system 1000 herein, and four commands are to be transmitted by the host system 1000 to the memory storage device 100. The four commands correspond to a command series 0-3. The commands corresponding to the command series 0-3 are referred to as a first command, a second command, a third command, and a fourth command respectively herein. The first command and the second command transmit command data to the memory storage device individually, and the third command and the fourth command have no command data to send. The command data transmitted by the first command is divided into two transmitting data packets, and the command data transmitted by the second command is divided into one transmitting data packet. All packets 601-619 illustrated in FIG. 6 comply with the HID class, and columns of each of the packets 601-619 are sorted as follows: a packet type column, a command series column, a transmitting series column, and a data column. The packet type in the packet type column are represented by C, D, S, R, and A. C represents the command packet; D represents the data packet; S represents the status packet; R represents the responding packet; A represents the retransmitting packet. Moreover, since three threads are executed on the host system 1000, the host system 1000 may process three commands simultaneously. Also, the "x" in the command series column and the transmitting series column represents that the data therein is not used in the present exemplary embodiment.

First, the host system 1000 transmits the command packets 601-603 to the memory management circuit 202 (or the memory controller 104). The command packet 601 corresponds to the first command; the command packet 602 corresponds to the second command; and the command packet 603 corresponds to the third command. Assume that the first command corresponds to a first thread; the second command corresponds to a second thread; the third command corresponds to a third thread. That is, the command packet 601 is transmitted by the first thread; the command packet 602 is transmitted by the second thread; the command packet 603 is transmitted by the third thread. If a packet belongs to a command packet, then the data in the data column of the packet records the content of a command or the length of command data. For example, if the first command is a write command, the data in the data column of the command packet 601 records a memory address to be written in by the first thread according to the first command and records that the command data to be transmitted by the first thread is divided as two transmitting data packets. However, the content of the command is not limited in the present invention. On the other hand, the length of the command data is recorded as the number of transmitting data packets in the exemplary embodiment. However, in other exemplary embodiments, the length of the command data may be recorded in byte or other values, and the present invention is not limited thereto.

The memory management circuit 202 (or the memory controller 104) constructs the status packet 604 and transmit the status packet 604 to the host system 1000. If a packet belongs to a status packet, then the data in the data column of the packet records a status of the memory management circuit 202 (or the memory controller 104). For example, the packet 604 records that the memory management circuit 202 (or the memory controller 104) is currently not in a busy status, that is, the memory management circuit 202 (or the memory controller 104) is able to receive a new command currently. However, it is noted that the memory management circuit 202 (or the memory controller 104) may transmit a status packet back to the host system 1000 either periodically or non-periodically. A time point for transmitting the status packet is not limited in the present invention.

Next, the host system 1000 constructs the data packets 605-607 and transmits them to the memory management circuit 202 (or the memory controller 104). The transmitting series recorded in the transmitting series column of a data packet (i.e. the transmitting data packet or the responding data packet) indicates a serial number of the data packet among a plurality of data packets to be transmitted. The data in the data column of the transmitting data packet belongs to command data. To be specific, the command data to be transmitted by the first thread is divided into two data packets (i.e. the data packets 605 and 607, which are also referred to as the transmitting data packets), wherein the serial number of the data packet 605 is 0 and the serial number of the data packet 607 is 1. On the other hand, the command data to be transmitted by the second command is divided into the data packet 606, wherein the serial number of the data packet 606 is 0. In other words, the data in the data columns of the data packets 605 and 607 are grouped into the command data to be transmitted by the first command, and the data in the data column of the data packet 606 is the command data to be transmitted by the second command. It is noted that, since there is no command data transmitted by the third thread, the third thread does not transmit any data packet to the memory management circuit 202 (or the memory controller 104).

After receiving the command packets 601-603, the memory management circuit 202 (or the memory controller 104) executes the operations corresponding to the first command, the second command, and the third command at least according to the data in the data columns of the command packets 601-603 respectively. For example, the memory management circuit 202 (or the memory controller 104) executes the operation corresponding to the data in the data column of the command packet 603. On the other hand, the memory management circuit 202 (or the memory controller 104) executes the operation corresponding to the first command at least according to the data in the data column of the command packet 601 and the data in the data columns of the data packets 605 and 607. The memory management circuit 202 (or the memory controller 104) also executes the operation corresponding to the second command at least according to the data in the data column of the command packet 602 and the data in the data column of the data packet 606. It is noted that the memory management circuit 202 (or the memory controller 104) may execute a data writing operation, a data reading operation, or a data moving operation. However, the content of these operations are not limited in the present invention.

The memory management circuit 202 (or the memory controller 104) generates a responding packet after completing the operation corresponding to a command. Moreover, the memory management circuit 202 (or the memory controller 104) may also generate responding data according to the operation result, and the data column of the responding packet may record the length of the responding data. For example, the responding packet 610 corresponds to the third command, and the data column of the responding packet 610 records the length of responding data (assumed to be 2). Therefore, the responding data corresponding to the third command is divided into two data packets (i.e. the data packets 611 and 613, which are also referred to as responding data packets). The transmitting series in the data packet 611 indicate the serial number of the data packet 611 (i.e. "0"), and the transmitting series in the data packet 613 indicates the serial number of the data packet 613 (i.e. "1"). The data in the data column of the data packet 611 belongs to the command data corresponding to the third command, and the data in the data column of the data packet 613 also belongs to the command data corresponding to the third command. That is, the data in the data columns of the data packets 611 and 613 is grouped into the responding data corresponding to the third command. The memory management circuit 202 (or the memory controller 104) constructs the data packets 611 and 613 and transmits the data packets 611 and 613 to the host system 1000.

On the other hand, the memory management circuit 202 (or the memory controller 104) does not generate responding data after finish executing the operation corresponding to the first command. Therefore, the memory management circuit 202 (or the memory controller 104) transmits the responding packet 612 back to the host system 1000, but the memory management circuit 202 (or the memory controller 104) does not transmit the data packet corresponding to the first command to the host system 1000. It is noted that the memory management circuit 202 (or the memory controller 104) first generates the responding packet corresponding to the third command and later generates the responding packet corresponding to the first command in the present exemplary embodiment. However, in other exemplary embodiments, the memory management circuit 202 (or the memory controller 104) may first generate the responding packet corresponding to the first command and later generate the packet corresponding to the third command. The generation order of the responding packets is not limited in the present invention.

After the host system 1000 receives the responding packets 610 and 612 as well as the data packets 611 and 613, the host system 1000 is able to know that the first command and the third command are finished executing. When the first command is finished executing, the first thread may further transmit the command packet 614 corresponding to the fourth command. In the present exemplary embodiment, the host system 1000 executes three threads, and therefore the host system 1000 may process at most three commands simultaneously. However, in other exemplary embodiments, the host system 1000 may execute more number or less number of threads so as to process more number or less number of commands, and the present invention is not limited thereto.

Similarly, after the operations corresponding to the second command and the fourth command are finished executing, the memory management circuit 202 (or the memory controller 104) generates the responding packets 616 and 618 as well as the data packets 617 and 619. The content of the packets will not be repeated herein.

Specially, after receiving the responding packet 610, the host system 1000 determines if one of the data packet 611 and data packet 613 is lost according to the data in the data column of the responding packet 610 and the transmitting series of the data packets 611 and 613. If one of the data packet 611 and the data packet 613 is lost, the host system 1000 transmits a retransmitting packet to the memory management circuit 202 (or the memory controller 104) so as to request the memory management circuit 202 (or the memory controller 104) to retransmit the lost data packet. Similarly, the host system 1000 also determines if the data packet 617 is lost according to the responding packet 616 and if the data packet 619 is lost according to the responding packet 618.

Figure 7:
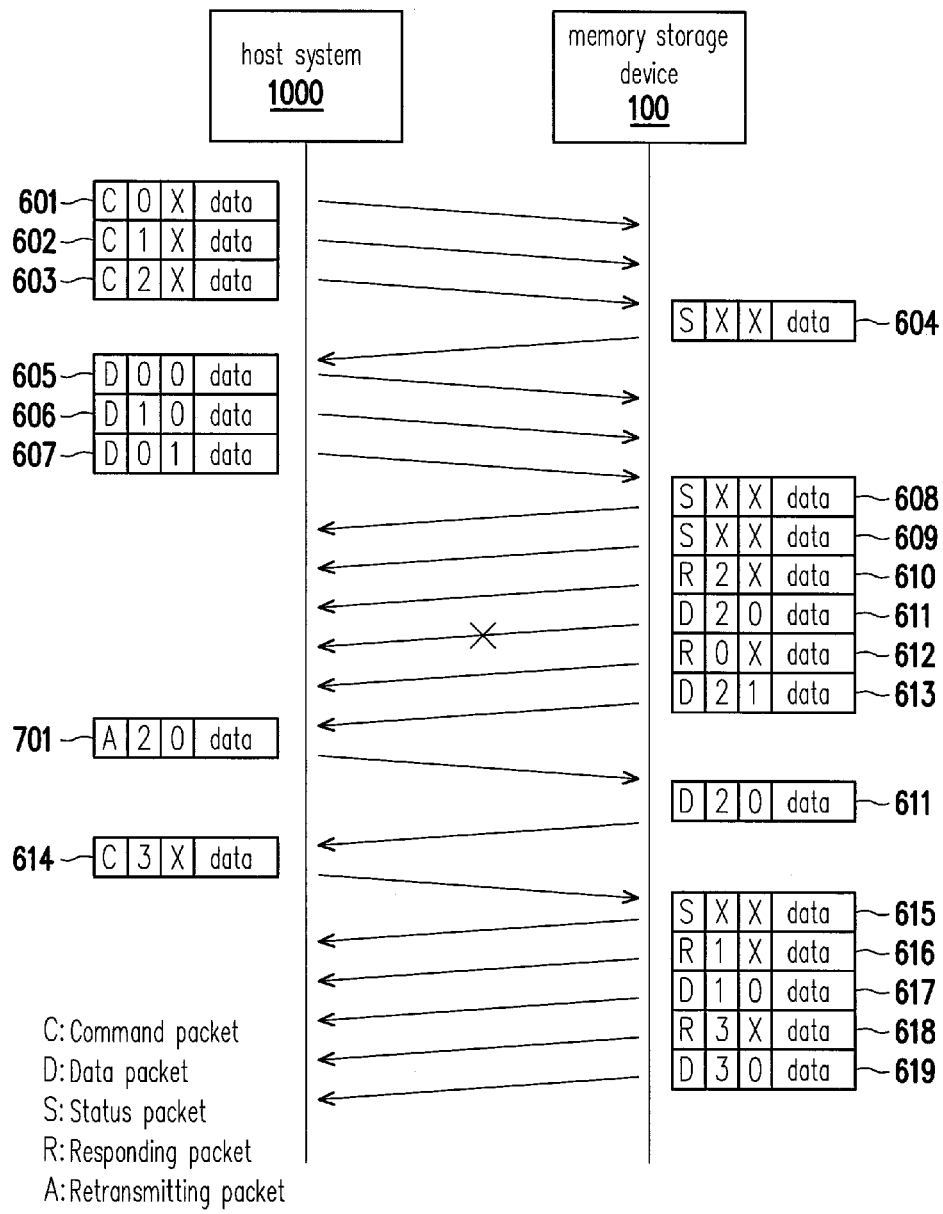
FIG. 7 is a flow chart of packet loss according to an exemplary embodiment.

FIG. 7 is a flow chart of packet loss according to an exemplary embodiment.

Referring to FIG. 7, assume that the data packet 611 (also referred to as a first responding data packet) is lost during transmission. Since the host system 1000 knows that the length of the responding data corresponding to the third command is 2 according to the responding packet 610, and the transmitting series in the data packet 613 is "1", the host system 1000 determines that the data packet 611 with the transmitting series "0" is lost according to the length of the responding data (i.e. 2) and the transmitting series of the data packet 613. After the data packet 611 is determined to be lost, the host system 1000 transmits a retransmitting packet 701 to the memory management circuit 202 (or the memory controller 104). The host system 1000 sets a command series in the retransmitting packet 701 to instruct the retransmitting packet 701 to be corresponding to the third command, and the transmitting series in the retransmitting packet 701 indicates the serial number of the data packet 611 (i.e. "0") among a plurality of data packets. After receiving the retransmitting packet 701, the memory management circuit 202 (or the memory controller 104) retransmits the data packet 611 to the host system 1000 so as to response to the transmitting packet 701.

In the present exemplary embodiment, the application 1105 and the memory management circuit 202 (or the memory controller 104) transmit and receive the packets 601-619 via a HID interface. However, in other exemplary embodiments, the application 1105 and the memory management circuit 202 (or the memory controller 104) may transmit and receive the packets 601-619 via a plurality of HID interfaces so as to allow the packets 601-619 to be transmitted simultaneously. For example, the first thread uses a first HID interface for transmitting the command packet 601, the data packet 605, and the data packet 607. The second thread uses a second HID interface to transmit the command packet 602 and the data packet 606. The third thread uses a third HID interface to transmit the command packet 603 and the retransmitting packet 701. Moreover, the first HID interface, the second HID interface, and the third HID interface are different from each other. However, the number of HID interfaces and which packets are sent by each of the HID interfaces are not limited in the present invention.

Figure 8:
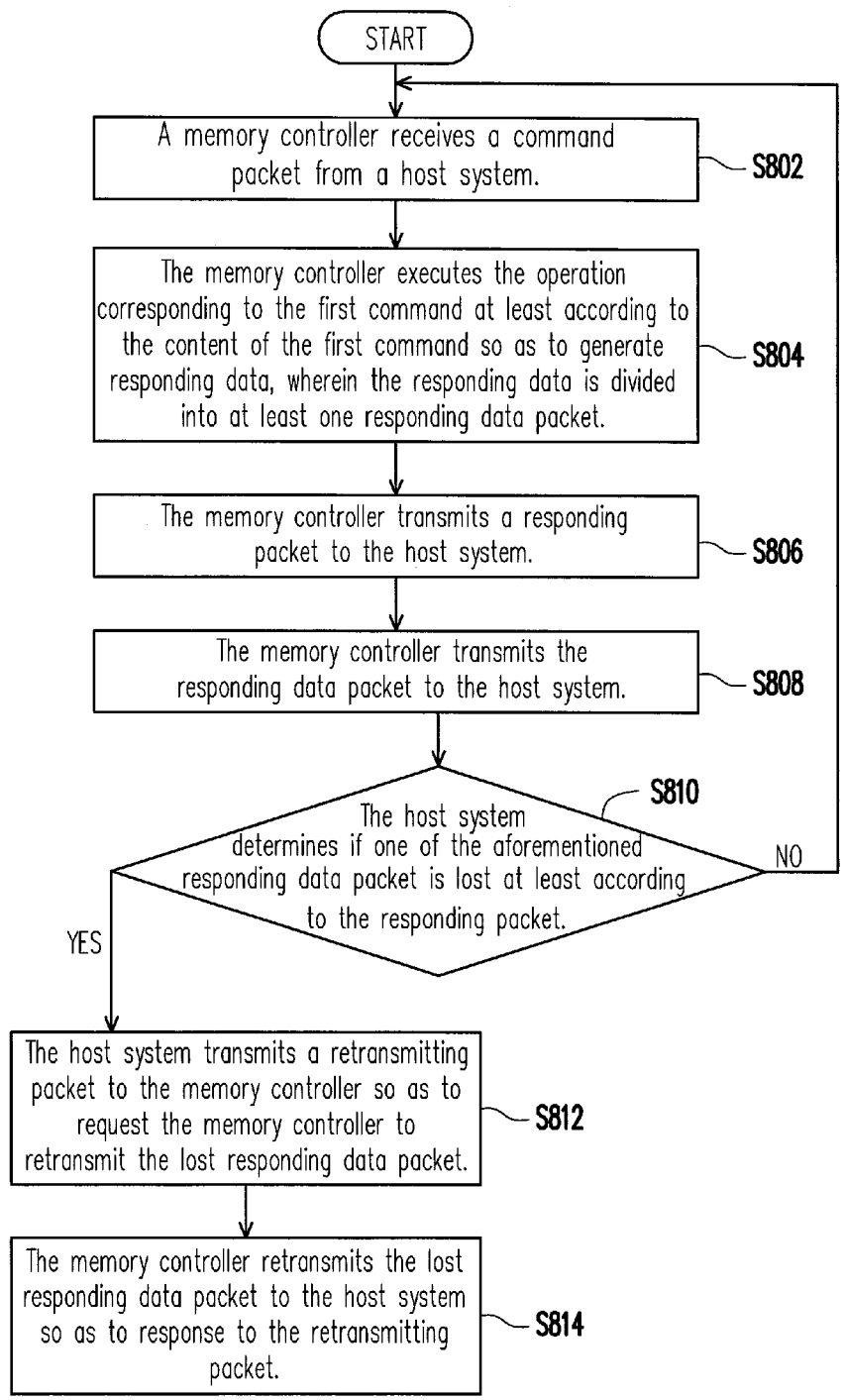
FIG. 8 is a flow chart of a data transmitting method according to an exemplary embodiment.

FIG. 8 is a flow chart of a data transmitting method according to an exemplary embodiment.

Referring to FIG. 8, in Step S802, a memory controller receives a command packet from a host system. A command series column of the command packet records a first command, and the data column of the command packet records the content of the first command.

In Step S804, the memory controller executes the operation corresponding to the first command at least according to the content of the first command so as to generate responding data, wherein the responding data is divided into at least one responding data packet.

In Step S806, the memory controller transmits a responding packet to the host system, wherein the command series column of the responding packet records the first command.

In Step S808, the memory controller transmits the responding data packet to the host system, wherein the command series column of the responding data packet records the first command.

In Step S810, the host system determines if one of the responding data packet is lost according to the responding packet.

If the result of Step S810 is true, in Step S812, the host system transmits a retransmitting packet to the memory controller so as to request the memory controller to retransmit the lost responding data packet. In Step S814, the memory controller retransmits the lost responding data packet to the host system so as to response to the retransmitting packet.

If the result of Step S810 is false, the memory controller returns to Step S802.

However, each of the steps in FIG. 8 has been described hereinbefore and therefore will not be repeated hereinafter. Additionally, the data transmitting method may be implemented by a plurality of program instructions, wherein the program instructions are executed by the memory controller referred in Step S802. However, in other exemplary embodiments, the memory controller may be arranged on a mouse, a printer, or other human interface devices. Alternatively, each of the steps in FIG. 8 may be implemented by one or a plurality of circuits, and the present invention is not limited thereto.

To sum up, since a packet corresponding with the HID class further includes the aforementioned columns in the data transmitting method, the memory controller, the memory storage device, and the data transmitting system provided in the exemplary embodiments of the present invention, each packet is able to be transmitted to a correct thread so that each thread may execute one or a plurality of commands independently. Furthermore, the applications and the memory management circuit (or the memory controller) may transmit packets via a plurality of HID interfaces so as to increase the number of transmitted packets. On the other hand, if one packet is lost, the applications may instruct the memory management circuit (or the memory controller) to retransmit the packet via a retransmitting packet so as to ensure the integrity of data.

The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data transmitting method for a memory controller, wherein the memory controller is configured to couple to a host system, and the host system is configured to execute a plurality of threads so as to transmit a plurality of commands to the memory controller via at least one human interface device (HID) interface, each of the commands corresponds to one of the threads, a plurality of packets are transmitted between the memory controller and the host system, the packets comply with a HID class, and each of the packets at least comprises a command series column and a data column, the data transmitting method comprises:
    receiving at least one command packet among the packets by the memory controller from the host system, wherein the command series column of the at least one command packet records a first command among the commands, and the data column of the at least one command packet records a content of the first command;
    executing an operation corresponding to the first command by the memory controller according to the content of the first command so as to generate responding data, wherein the responding data is divided into at least one responding data packet among the packets;

transmitting a responding packet among the packets by the memory controller to the host system, wherein the command series column of the responding packet records the first command;

transmitting he at least one responding data packet by the memory controller to the host system, wherein the command series column of the at least one responding data packet records the first command;

determining if one of the at least one responding data packet is lost according to the responding packet by the host system, wherein the loss of the at least one responding data packet occurs during the at least one responding data packet being transmitted;

if the host system determines that a first responding data packet among the at least one responding data packet is lost, transmitting a retransmitting packet among the packets by the host system to the memory controller so as to request the memory controller to retransmit the first responding data packet, wherein the command series column of the retransmitting packet records the first command; and retransmitting the first responding data packet by the memory controller to the host system so as to response to the retransmitting packet.

2. The data transmitting method of claim 1, wherein the data column of the at least one command packet further records a length of command data.

3. The data transmitting method of claim 2, wherein the at least one command packet comprises a first command packet and a second command packet, the command series column of the first command packet records the first command, the command series column of the second command packet records a second command, the command data corresponds to the second command, the command data is at least divided into a transmitting data packet among the packets, each of the packets further comprises a transmitting series column, and the data transmitting method further comprises:

receiving the transmitting data packet by the memory controller from the host system, wherein the command series column of the transmitting data packet records the second command, the transmitting series column of the transmitting data packet records a serial number of the transmitting data packet, and the data column of the transmitting data packet records at least a portion of the command data; and executing an operation corresponding to the second command by the memory controller according to the second command packet and the command data.

4. The data transmitting method of claim 3, wherein the at least one HID interface comprises a first HID interface and a second HID interface, the first HID interface is different from the second HID interface, the host system transmits the first command packet via the first HID interface, and the host system transmits the second command packet via the second HID interface.

5. The data transmitting method of claim 1, wherein the data column of the responding packet records a length of the responding data.

6. The data transmitting method of claim 5, wherein each of the packets further comprises a transmitting series column, the transmitting series column of the first responding data packet records a serial number of the first responding data packet, and the data column of the first responding data packet records at least a portion of the responding data.

7. The data transmitting method of claim 6, wherein the step of determining if one of the at least one responding data packet is lost according to the responding packet by the host system comprises:

determining if one of the at least one responding data packet is lost according to the length of the responding data and the transmitting series column of the at least one responding data packet by the host system, wherein the step of transmitting the retransmitting packet by the host system to the memory controller further comprises:

recording the serial number of the first responding data packet in the transmitting series column of the retransmitting packet by the host system.

8. The data transmitting method of claim 1 further comprising:

transmitting a status packet among the packets by the memory controller to the host system, wherein the data column of the status packet records a status of the memory controller.

9. A memory controller for controlling a rewriteable non-volatile memory module, wherein the memory controller comprises:

a host interface, configured to couple to a host system, wherein the host system is configured to execute a plurality of threads so as to transmit a plurality of commands to the memory controller via at least one human interface device (HID) interface, each of the commands corresponds to one of the threads, a plurality of packets are transmitted between the memory controller and the host system, the packets comply with a HID class, and each of the packets at least comprises a command series column and a data column;

a memory interface, configured to couple to the rewriteable non-volatile memory module; and a memory management circuit, coupled to the host interface and the memory interface, configured to receive at least one command packet among the packets from the host system, wherein the command series column of the at least one command packet records a first command among the commands, the data column of the at least one command packet records a content of the first command, wherein the memory management circuit is configured to execute an operation corresponding to the first command at least according to the content of the first command so as to generate responding data, wherein the responding data is divided into at least one responding data packet among the packets, wherein the memory management circuit is configured to transmit a responding packet among the packets to the host system, wherein the command series column of the responding packet records the first command, wherein the memory management circuit is configured to transmit the at least one responding data packet to the host system, wherein the command series column of the at least one responding data packet records the first command, wherein the memory management circuit is configured to receive a retransmitting packet among the packets from the host system if a first responding data packet among the at least one responding data packet is lost, wherein the command series column of the retransmitting packet records the first command, wherein the loss of the at least one responding data packet occurs during the at least one responding data packet being transmitted, wherein the memory management circuit is configured to retransmit the first responding data packet to the host system so as to response to the retransmitting packet.

10. The memory controller of claim 9, wherein the data column of the at least one command packet further records a length of command data.

11. The memory controller of claim 10, wherein the at least one command packet comprises a first command packet and a second command packet, the command series column of the first command packet records the first command, the command series column of the second command packet records a second command, the command data corresponds to the second command, the command data is at least divided into a transmitting data packet among the packets, and each of the packets further comprises a transmitting series column,
wherein the memory management circuit is further configured to receive the transmitting data packet from the host system, wherein the command series column of the transmitting data packet records the second command, the transmitting series column of the transmitting data packet records a serial number of the transmitting data packet, and the data column of the transmitting data packet records at least a portion of the command data,
wherein the memory management circuit is further configured to execute an operation corresponding to the second command according to the second command packet and the command data.

12. The memory controller of claim 9, wherein the data column of the responding packet records a length of the responding data.

13. The memory controller of claim 12, wherein each of the packets further comprises a transmitting series column, the transmitting series column of the first responding data packet records a serial number of the first responding data packet, and the data column of the first responding data packet records at least a portion of the responding data.

14. The memory controller of claim 13, wherein the transmitting series column of the retransmitting packet records the serial number of the first responding data packet.

15. The memory controller of claim 9, wherein the memory management circuit is further configured to transmit a status packet among the packets to the host system, wherein the data column of the status packet records a status of the memory controller.

16. A data transmitting system comprising:
a host system; and
a memory storage device,
wherein the host system is configured to execute a plurality of threads so as to transmit a plurality of commands to the memory storage device via at least one human interface device (HID) interface, each of the commands corresponds to one of the threads, a plurality of packets are transmitted between the memory storage device and the host system, the packets comply with a HID class, and each of the packets at least comprises a command series column and a data column,
wherein the memory storage device is configured to receive at least one command packet among the packets from the host system, wherein the command series column of the at least one command packet records a first command among the commands, the data column of the at least one command packet records a content of the first command,
wherein the memory storage device is configured to execute an operation corresponding to the first command according to the content of the first command so as to generate responding data, wherein the responding data is divided into at least one responding data packet among the packets,
wherein the memory storage device is configured to transmit a responding packet among the packets to the host system, wherein the command series column of the responding packet records the first command,
wherein the memory storage device is configured to transmit the at least one responding data packet to the host system, wherein the command series column of the at least one responding data packet records the first command,
wherein the host system is configured to determine if one of the at least one responding data packet is lost according to the responding packet, wherein the loss of the at least one responding data packet occurs during the at least one responding data packet being transmitted,
wherein if the host system determines that a first responding data packet among the at least one responding data packet is lost, the host system is configured to transmit a retransmitting packet among the packets to the memory storage device so as to request the memory storage device to retransmit the first responding data packet, wherein the command series column of the retransmitting packet records the first command,
wherein the memory storage device is configured to retransmit the first responding data packet to the host system so as to response to the retransmitting packet.

17. The data transmitting system of claim 16, wherein the data column of the at least one command packet further records a length of command data.

18. The data transmitting system of claim 17, wherein the at least one command packet comprises a first command packet and a second command packet, the command series column of the first command packet records the first command, the command series column of the second command packet records a second command, the command data corresponds to the second command, the command data is at least divided into a transmitting data packet among the packets, and each of the packets further comprises a transmitting series column,
wherein the memory storage device is further configured to receive the transmitting data packet from the host system, the command series column of the transmitting data packet records the second command, the transmitting series column of the transmitting data packet records a serial number of the transmitting data packet, and the data column of the transmitting data packet records at least a portion of the command data,
wherein the memory storage device is further configured to execute an operation corresponding to the second command according to the second command packet and the command data.

19. The data transmitting system of claim 18, wherein the at least one HID interface comprises a first HID interface and a second HID interface, the first HID interface is different from the second HID interface, the host system transmits the first command packet via the first HID interface, and the host system transmits the second command packet via the second HID interface.

20. The data transmitting system of claim 16, wherein the data column of the responding packet records a length of the responding data.

21. The data transmitting system of claim 20, wherein each of the packets further comprises a transmitting series column, the transmitting series column of the first responding data packet records a serial number of the first responding data packet, the data column of the first responding data packet records at least a portion of the responding data.

22. The data transmitting system of claim 21, wherein the operation that the host system determines if one of the at least one responding data packet is lost according to the responding packet comprises:
- the host system determines if one of the at least one responding data packet is lost according to the length of the responding data and the transmitting series column of the at least one responding data packet,
- wherein the operation that the host system transmits the retransmitting packet to the memory storage device further comprises:
- the host system records the serial number of the first responding data packet in the transmitting series column of the retransmitting packet.

23. The data transmitting system of claim 16, wherein the memory storage device is further configured to transmitting a status packet among the packets to the host system, wherein the data column of the status packet records a status of the memory storage device.

* * * * *